No. 646,231. Patented Mar. 27, 1900.
A. G. McINTOSH.
GRAIN BINDER.
(Application filed May 4, 1899.)
(No Model.) 8 Sheets—Sheet 3.

No. 646,231. Patented Mar. 27, 1900.
A. G. McINTOSH.
GRAIN BINDER.
(Application filed May 4, 1899.)
(No Model.) 8 Sheets—Sheet 4.

WITNESSES:  INVENTOR
  A. G. McIntosh
BY
  ATTORNEYS.

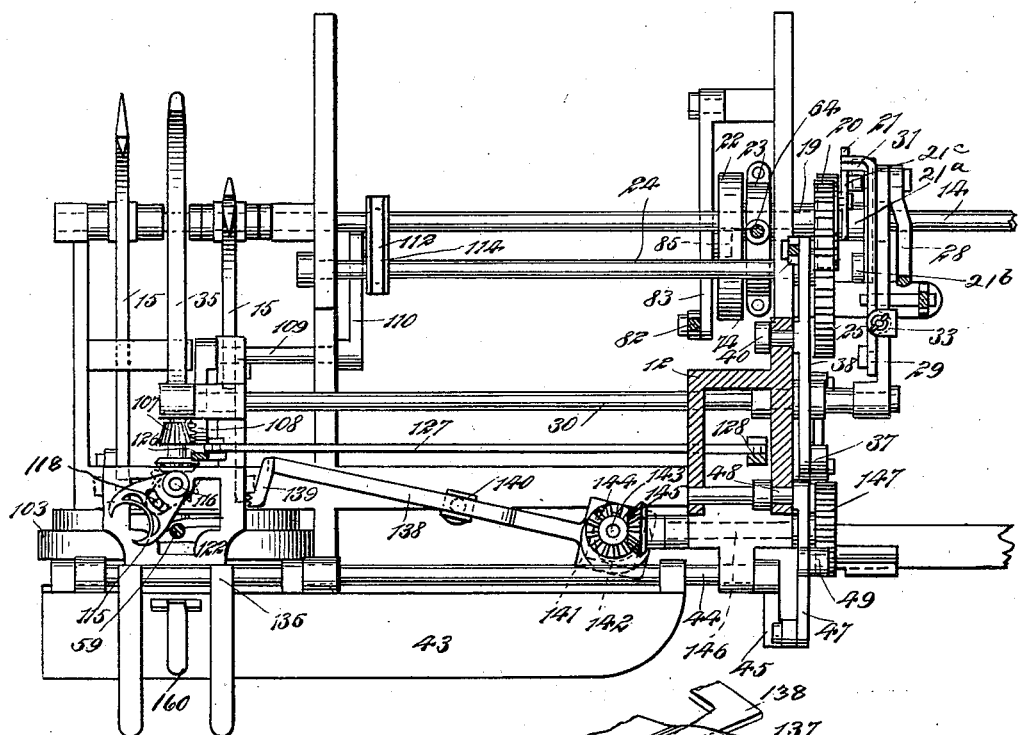

No. 646,231. Patented Mar. 27, 1900.
A. G. McINTOSH.
GRAIN BINDER.
(Application filed May 4, 1899.)
(No Model.) 8 Sheets—Sheet 6.

WITNESSES:

INVENTOR
A. G. McIntosh
BY
ATTORNEYS

No. 646,231. Patented Mar. 27, 1900.
A. G. McINTOSH.
GRAIN BINDER.
(Application filed May 4, 1899.)
(No Model.) 8 Sheets—Sheet 7.
FIG. 13.
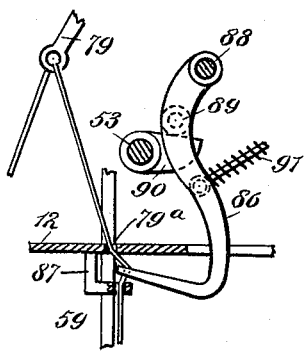
FIG. 14.
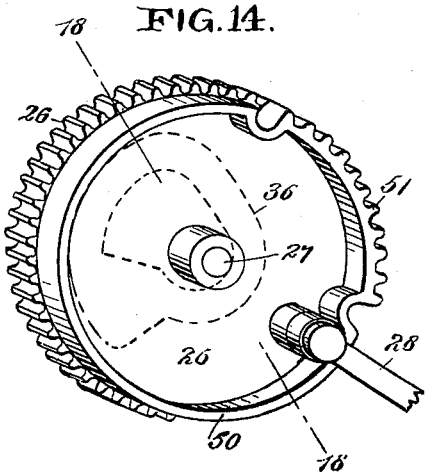
FIG. 15.
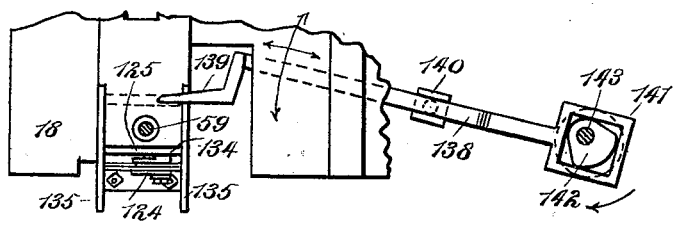
FIG. 17.
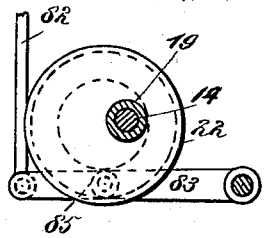
FIG. 16.
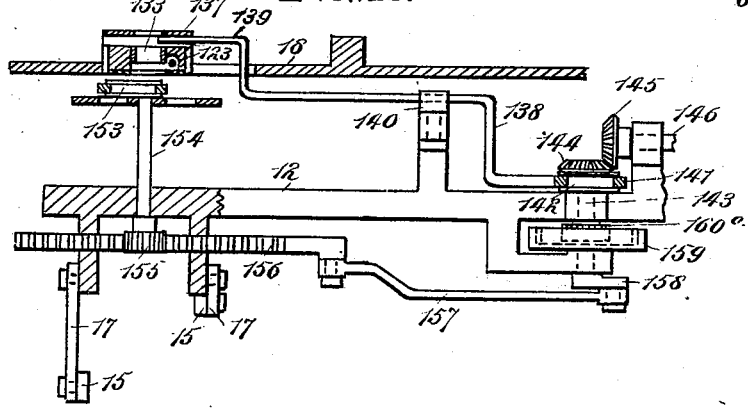
FIG. 18.
FIG. 19.
WITNESSES:
Donn Twitchell
Isaac B. Owens
INVENTOR
A. G. McIntosh
BY
Munn
ATTORNEYS
THE NORRIS PETERS CO., PHOTO-LITHO., WASHINGTON, D. C.

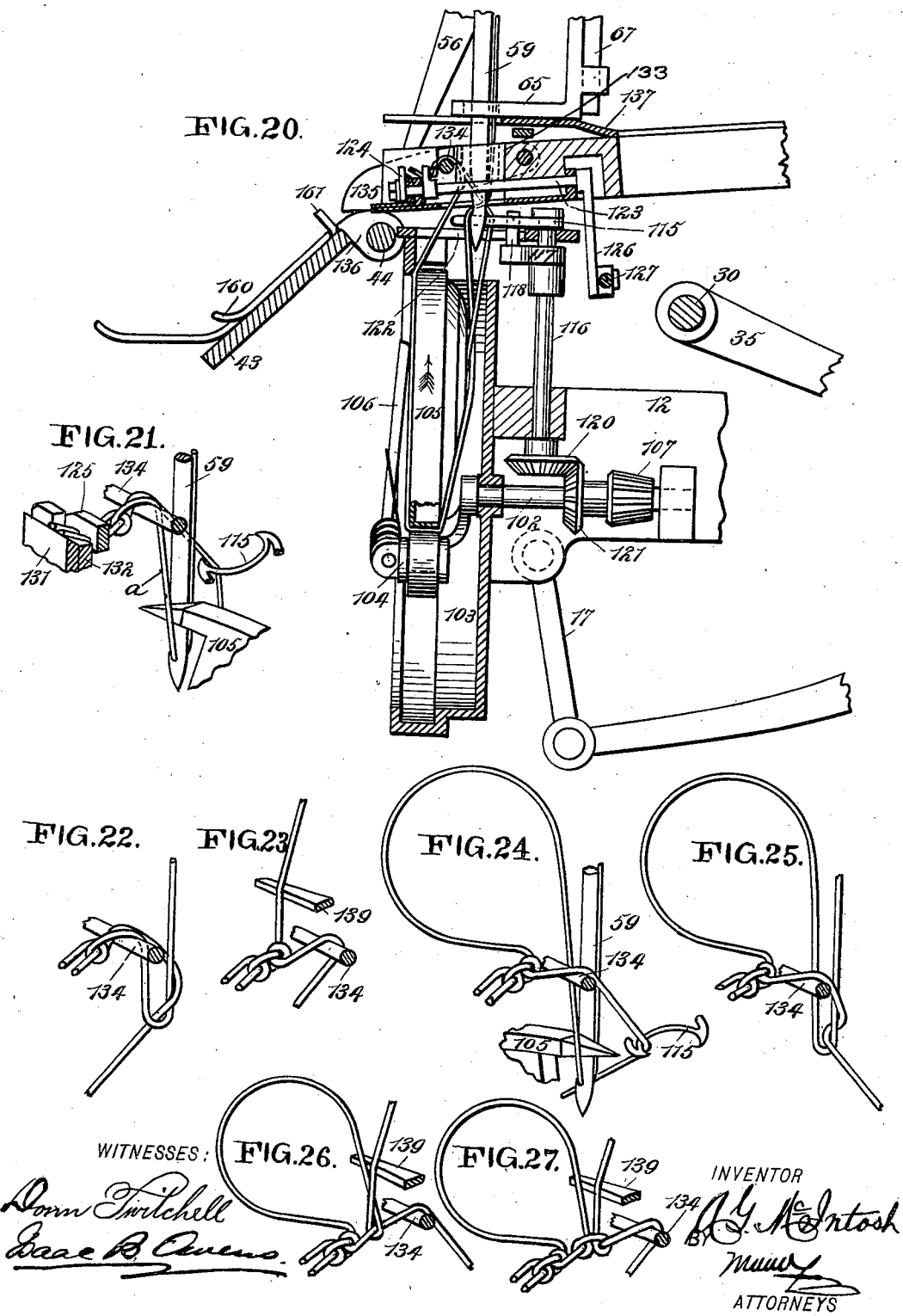

UNITED STATES PATENT OFFICE.

ALEXANDER G. McINTOSH, OF ATALISSA, IOWA.

GRAIN-BINDER.

SPECIFICATION forming part of Letters Patent No. 646,231, dated March 27, 1900.

Application filed May 4, 1899. Serial No. 715,539. (No model.)

*To all whom it may concern:*

Be it known that I, ALEXANDER G. McINTOSH, of Atalissa, in the county of Muscatine and state of Iowa, have invented a new and Improved Grain-Binder, of which the following is a full, clear, and exact description.

This invention relates to a grain-binding apparatus in which the knot is tied by means of a needle reciprocating toward and from a shuttle, the driving and controlling means being specially constructed to properly operate the needle and shuttle.

This specification is the disclosure of several forms of my invention, while the claims define the actual scope of the invention.

Reference is to be had to the accompanying drawings, forming a part of this specification, in which similar characters of reference indicate corresponding parts in all the views.

Figure 1:
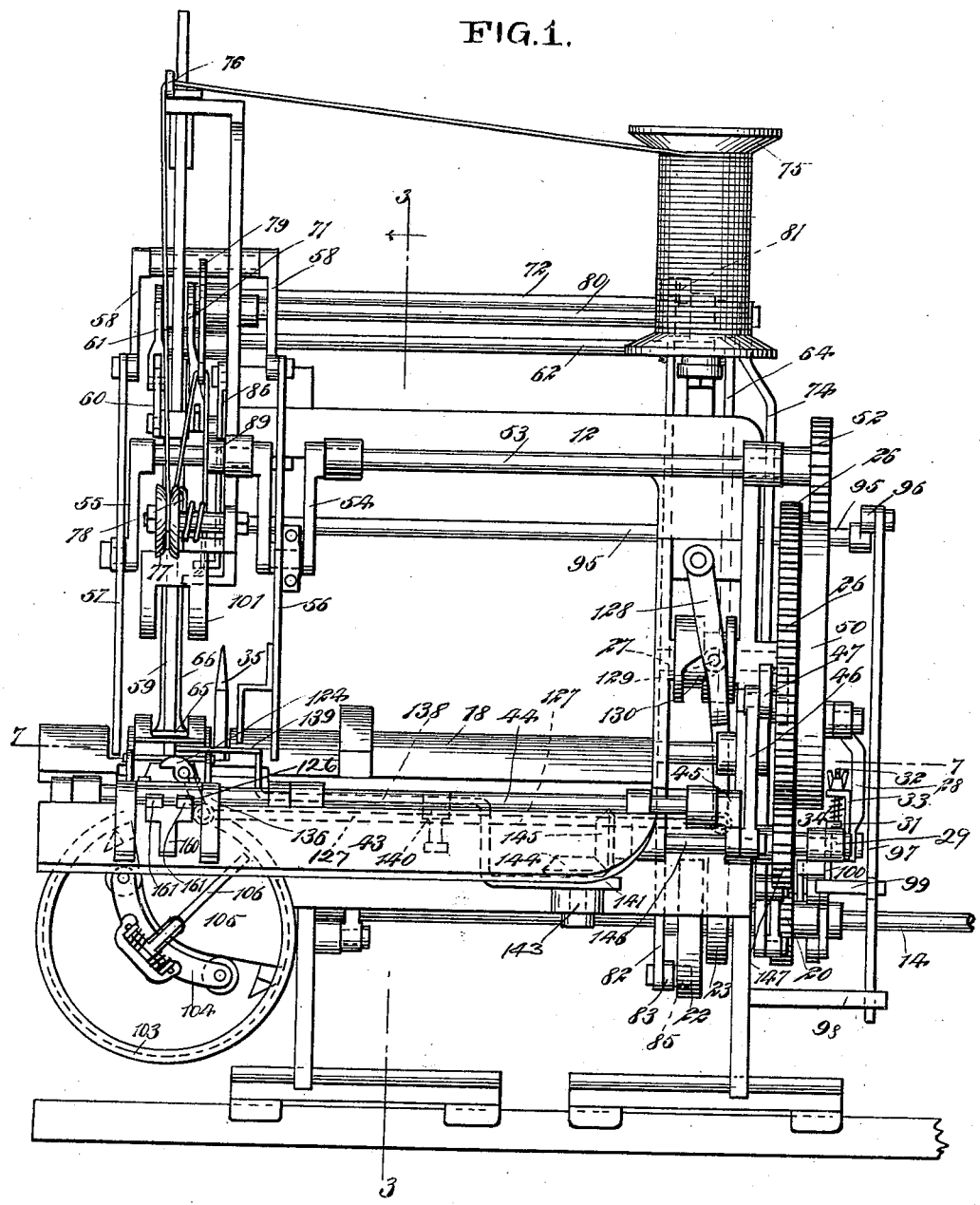
Figure 2:
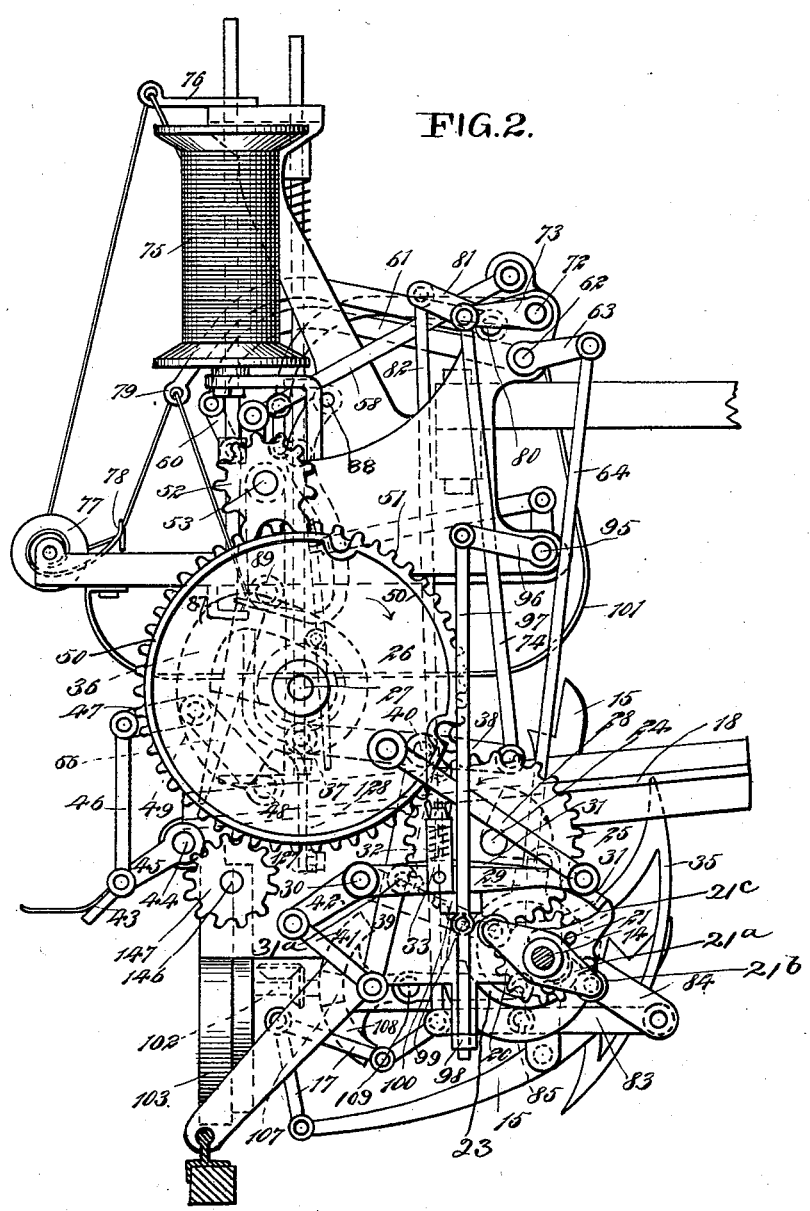
Figure 3:
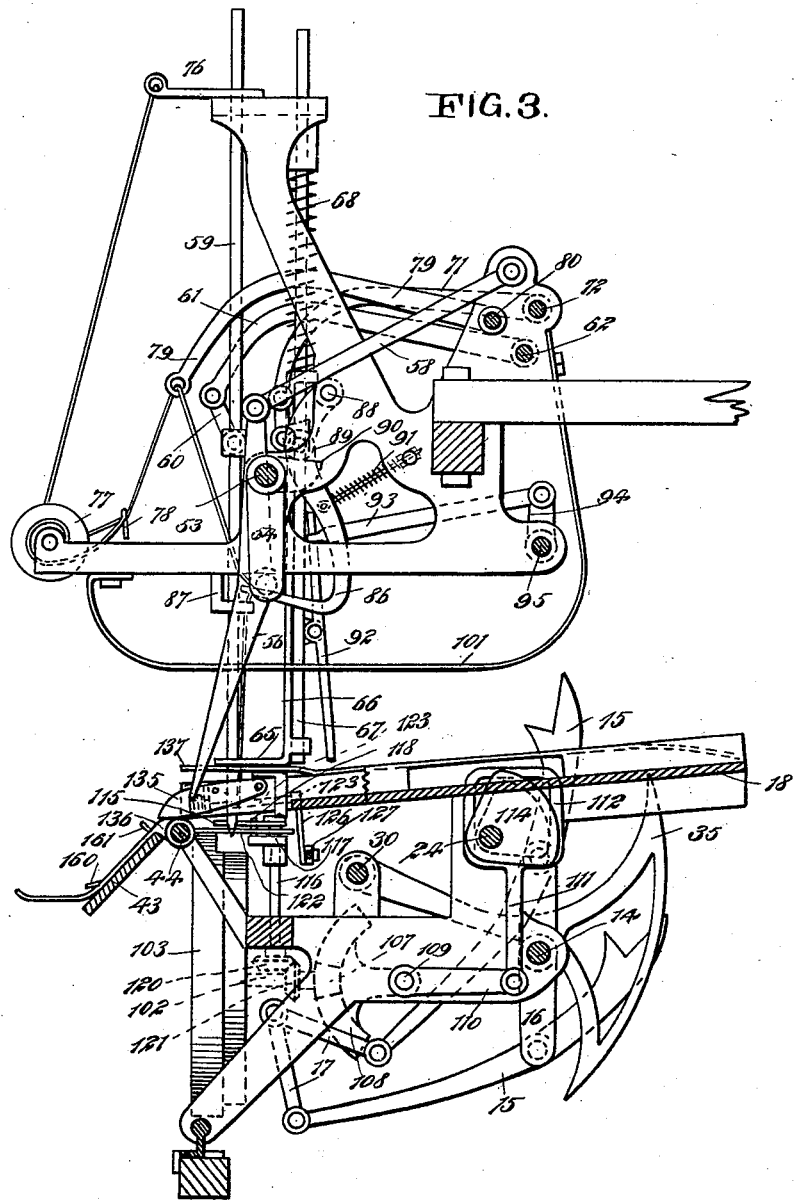
Figure 4:
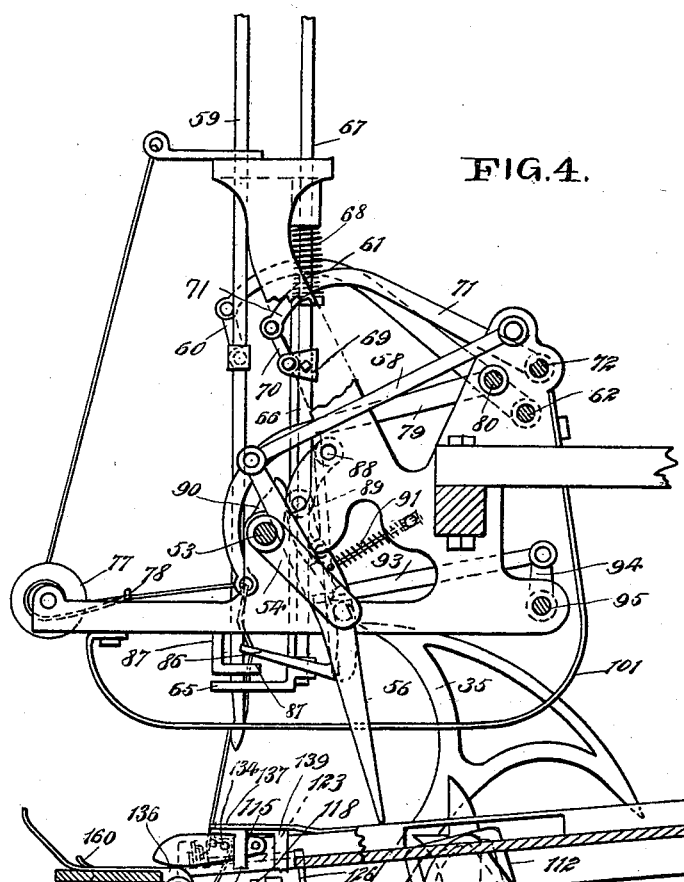
Figures 5, 6:
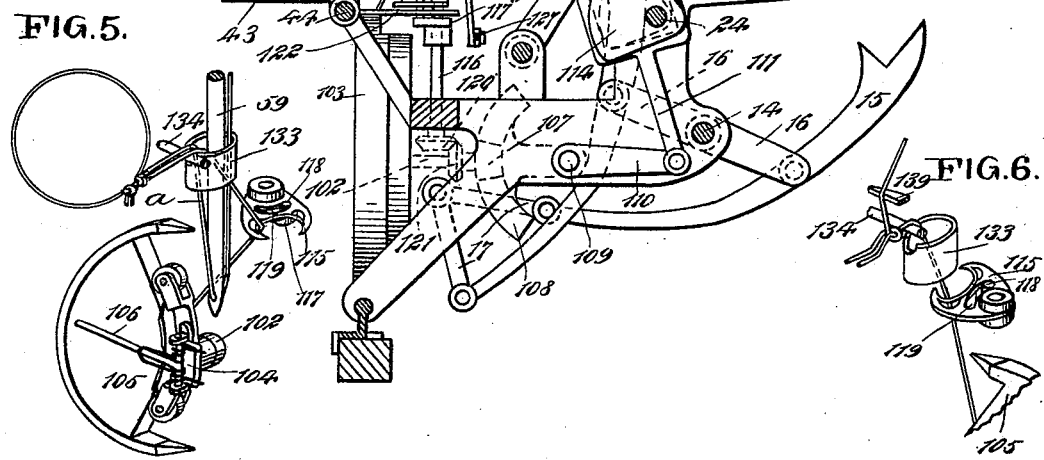
Figure 11:
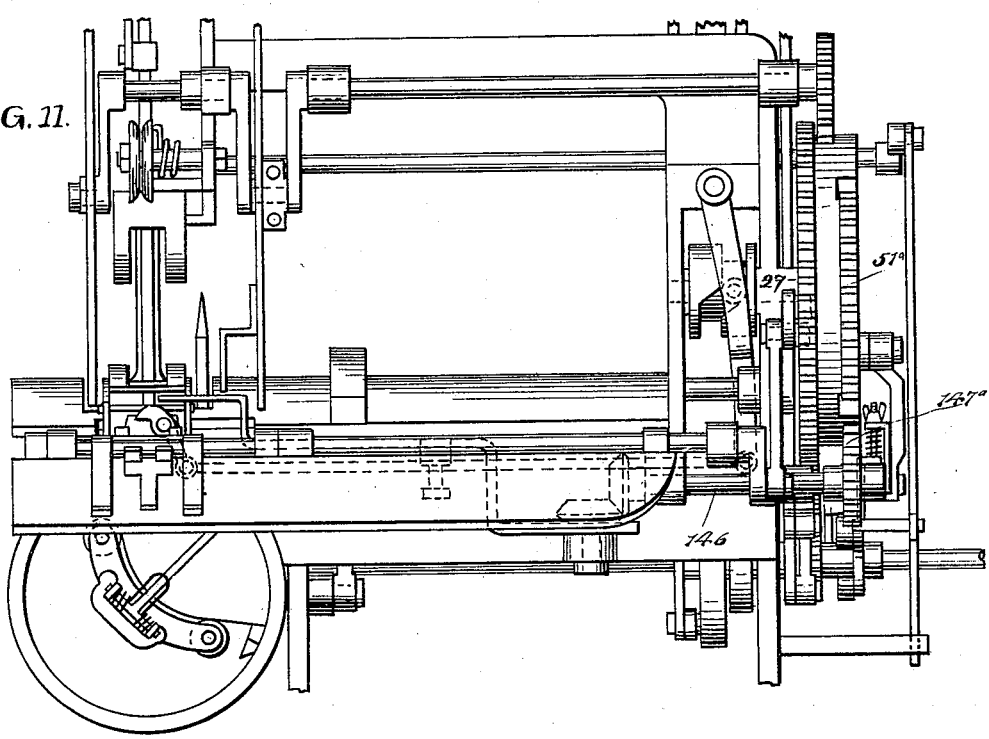
Figure 12:
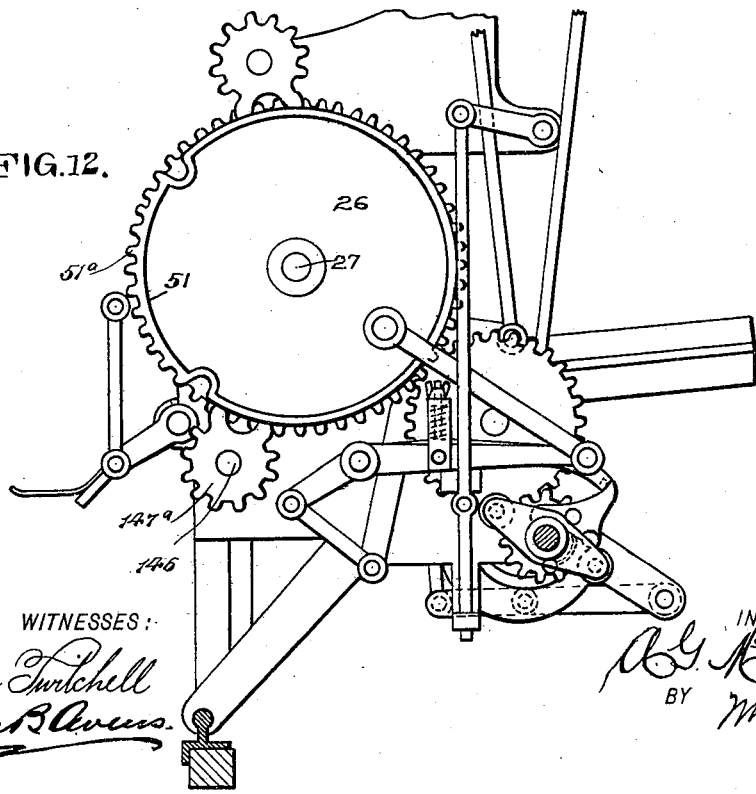

Figure 1 is a front elevation of the machine. Fig. 2 is a left-hand side elevation thereof. Fig. 3 is a sectional view on the line 3 3 of Fig. 1. Fig. 4 is a similar view showing the parts in a different position. Fig. 5 is a fragmentary perspective view illustrating a completed gavel-band and the needle, shuttle, and twine-disposing claw, such view illustrating the formation of a knot. Fig. 6 is a like view showing the parts in a different position. Fig. 7 is a sectional plan view looking down from the line 7 7 of Fig. 1 and with the binding-table removed. Fig. 8 is a fragmentary plan view of the knotting-machine. Fig. 9 is a perspective view of the twine cutter and holder. Fig. 10 is a plan view illustrating a modification of the twine-disposing gear. Fig. 11 is a front elevation of a modified arrangement of the knot-tightening finger. Fig. 12 is a side elevation thereof. Fig. 13 is a detail view of the lower take-up arm and the immediately-coacting parts. Fig. 14 is a detail perspective view of one of the gears employed in my invention. Fig. 15 is a fragmentary plan view with parts in horizontal section, illustrating the arm for tightening the hitches forming the knot. Fig. 16 is a bottom plan view, partly in section, showing the parts illustrated in Fig. 10. Fig. 17 is a view in elevation with parts in section, the view illustrating one of the grooved cams which are employed, such cam driving the upper take-up arm. Fig. 18 is a sectional view on the line 18 18 in Fig. 14. Fig. 19 is a fragmentary view illustrating the yielding arm which releases the clutch, permitting the same to move into gear. Fig. 20 is an enlarged section taken vertically through the shuttle-box and illustrating the shuttle in section with the needle and the twine cutting and clamping devices, and Figs. 21 to 27 are fragmentary perspective views illustrating the manner in which the knot is tied.

The frame 12 of the binding mechanism is mounted upon the harvesting apparatus in the usual position and carries the mobile parts of the binding mechanism. The prime mover or drive-shaft 14 is mounted to turn in the frame and is driven by suitable gearing from the traction-wheel of the harvester. This shaft has the packer-arms 15 connected therewith by the double cranks 16. The packer-arms are joined to the frame by links 17, (see Figs. 16 and 20,) so as to operate in the usual manner to force the grain forward on the binding-table 18. In the operation of the apparatus the drive-shaft and packer-arms operate continuously, while the knotting and binding mechanism is periodically thrown into and out of gear under control of the gavel.

A sleeve 19 (see Fig. 7) is mounted loose on the shaft 14 and carries a pinion 20, which sleeve and pinion may be rendered fast to the shaft by means of a clutch 21. This sleeve 19 also carries a grooved cam 22 and an eccentric 23, so that when the clutch 21 is thrown into action the sleeve 19, with the parts 20, 22, and 23, is turned with the shaft.

The clutch 21 is essentially of the well-known Appleby type, and therefore comprises a cross-arm 21ª, carried on and turning continuously with the shaft 14 and having rollers 21ᵇ at its ends. A three-cornered dog 21ᶜ is carried on the pinion 20 and has a projection capable of engaging the rollers 21ᵇ to connect the arm 21ª with the pinion, and thus to drive the pinion. The dog 21ᶜ is spring-pressed to a position with the projection in the path of the roller 21ᵇ, whereby normally to hold the clutch members engaged and the dog fast on the shaft 14; but when the dog is moved from such position it throws this projection out of the path of the rollers on the cross-arm, thus disconnecting the members of the clutch.

The knotter-shaft 24 is mounted to turn in the frame and carries a gear 25 in mesh with the pinion 20. Meshing with the spur-gear 25 is a spur-gear 26, (see Figs. 2, 14, and 18,) fast on a short revoluble shaft 27, carried in the frame. Pivoted to the spur-gear 26 is a link 28, the free end of which is pivoted to an arm 29, in turn mounted loosely on the divider or gavel-forming shaft 30. (see Figs. 2 and 7.) The arm 29 does not influence the movements of the divider-shaft 30, the action of which shaft will be fully described hereinafter. Pivoted to the arm 29 at the point 31$^a$, Fig. 2, is a clutch-actuating arm 31, which is yieldingly connected with the arm 29, normally to move therewith by means of a bolt 32, fast to the arm 31 and sliding in a lip 33, fast to the arm 29. (See Fig. 19.) An expansive spring 34 surrounds the bolt 32 and engages the arm 31 and the lip 33. Therefore as the gear 26 turns, the arm 29, through the medium of the link 28, will be moved up and down on the shaft 30, and the arm 31 will be moved with the arm 29. When the arms 29 and 31 are thrown down to their lowermost position, as shown in Fig. 2, the arm 31 will engage with the dog 21$^c$ of the clutch 21 to move the same out of the path of the rollers 21$^b$, thus keeping the gear 20 loose on the shaft 14, whereby to stop the action of the knotting and binding mechanisms. The purpose of yieldingly mounting the arm 31 on the arm 29 is to permit the arm 31 to be moved up independently of the arm 29 to release the dog 21$^c$ of the clutch 21 when it is again necessary to start the knotting and binding mechanisms. This independent movement of the arm 29 is effected by means which will be hereinafter described. From this it follows that when the clutch 21 is thrown into action the shaft 14 imparts its movement to the gears 20, 25, and 26, which last-named gear drives the link 28, and during a single revolution of the gear 26 the arm 29 is lifted from the plane of the clutch 21 and again lowered, so that the arm 31 again engages the clutch to throw the same out of action. During this revolution of the gear 26 a band is tied around the gavel.

The packing-arms 15 force the grain forward on the table 18, and when the grain has been gathered on the table sufficient to form a bundle the arm 31 is raised from the clutch to throw the clutch into gear, and the consequent movement of the gear 26 serves to actuate the divider-arm 35, which arm is mounted fast on the shaft 30, before mentioned. The inner face of the gear 26 is formed with a cam-groove 36, (see the dotted lines in Fig. 2,) in which groove plays a roller 37, fast on a spider, having a horizontal member 38 and a vertical member 39, rigidly connected thereto. The spider is pivoted at the point 40. (See dotted lines in Fig. 2.) Therefore as the gear 26 turns the spider is rocked on its pivot 40. The vertical arm of the spider is pivoted at its lower end to a link 41, which in turn is pivoted to a crank 42, fast on the divider-shaft 30. Now as the spider rocks its movement is imparted to the divider-shaft and the divider 35 is raised from the position shown in Figs. 2 and 3 to the position shown in Fig. 4, in which position the divider is above the table 18, the divider having then acted to form or divide the gavel from the rest of the grain and to force the gavel forwardly into position to be engaged by the gavel-advancing arms, to be hereinafter described.

The table 18 has at its front an extension-leaf 43, which is mounted fast on a rock-shaft 44. This shaft has a crank 45 at its left-hand end, which is pivoted to a link 46, extending upwardly to an angle-arm 47. This arm is pivoted at the point 48 (see the full lines in Fig. 7) and carries an antifriction-roller 49, which plays in the cam-groove 36 of the gear 26. The gavel during the knotting operation rests on the leaf 43 of the table, and the parts are so timed that when the tying operation is complete the leaf will be dropped to the position shown in Fig. 2, and the gavel will then be thrown from the machine.

The gear 26 carries rigidly on its left-hand or outer face a mutilated gear-band 50, which has three-quarters of its surface smooth and the remaining quarter formed with gear-teeth 51. The gear-band 50, with its teeth 51, acts with a mutilated pinion 52 in such a manner that the pinion 52 will be turned once for each revolution of the band 50 and gear 26. The pinion 52 is fast on a shaft 53, revolubly mounted in the frame and extending transversely across the same. The shaft 53 carries two cranks 54 and 55, on which are pivoted, respectively, the gavel-advancing arms 56 and 57. These arms are pivotally connected at their upper ends to links 58, which in turn are pivoted to the frame. By the revolution of the shaft 53 the gavel-advancing arms 56 and 57 are caused to move forwardly over the table 18 and thence upwardly and rearwardly to the first position, so that the gavel when formed by the divider 35 is by the arms 56 and 57 moved rearward to the leaf 43 of the table.

The needle 59 is in the form of a straight vertically-disposed bar mounted to reciprocate longitudinally in the frame 12. The needle has a short link 60 pivoted thereto, which link in turn is pivoted to a forwardly and downwardly extending arm 61, fast on the needle-shaft 62, mounted transversely in the rear part of the frame. This shaft 62 has at its left-hand extremity a fast crank-arm 63, to which is pivoted a downwardly-extending link 64, connected with the aforesaid eccentric 23, driven from the primary movement or drive-shaft 14. Therefore as the clutch 21 operates to make the sleeve 19 fast to the shaft 14 the eccentric 23 is driven to rock the needle-shaft 62 and through the medium of the arm 61 and link 60 to drive the needle 59. Working in time with the needle is a presser-foot 65, which is fast to a bar 66, mounted to slide on a rod 67 and engaged by an expansive spring 68, which spring operates to hold the bar 66, and consequently the presser-foot 65, yieldingly on the rod 67, thus causing the bar 66 to normally reciprocate with the rod. Fastened to the rod 67 is a clip 69, (see the dotted lines in Fig. 4,) to which clip is pivoted a link 70, in turn pivoted to an arm 71, fast to the presser-foot shaft 72, such shaft being mounted transversely in the rear of the frame and extending through the same to the left-hand end thereof. (See Fig. 2) Secured to the said left-hand end of the presser-foot shaft 72 is a crank-arm 73, to which is pivoted a link 74, running downward to and having pivotal connection with the rear extremity of the horizontal arm 38 of the aforesaid spider. Therefore as the gear 26 turns and the spider is rocked on its pivot 40 the rod 74 and crank-arm 73 serve to rock the presser-foot shaft 72, and consequently to drive the rod 67 and the attached presser-foot. The action of the needle and presser-foot shafts is so relatively timed that the presser-foot makes one movement for every four of the needle, which arrangement is necessary to permit the proper movements of the gavel, as will be apparent as this description continues. In this connection it will be seen that the needle is driven from shaft 14 and that the presser-foot is driven from gear 26, which makes one revolution for every four of the shaft 14. The form of the cam-slot 36 is such that the presser-foot is held down during three-quarters of a revolution of gear 26 and moves up and down during the other quarter of a revolution of said gear.

The needle-twine is wound on a spool 75 and passes rightward across the front of the machine through a fair-leader 76, from which the twine passes down around a tension-wheel 77 and through a spring-tension arm 78. From here the twine passes through the upper take-up arm 79, which is fast to the take-up shaft 80, mounted to rock in the rear of the frame and extended transversely across to the left-hand extremity thereof. (See Fig. 2.) Fast to the left-hand end of the take-up shaft 80 is a crank-arm 81, to which is pivoted a downwardly-extending link 82, the lower end of which is pivoted to an arm 83, mounted to swing on a strut 84, running out rearwardly and downwardly from the frame. The arm 83 carries an antifriction-roller 85, which roller plays in the groove in the before-mentioned cam 22 of the sleeve 19. (See Figs. 2 and 17.) Therefore as the said sleeve turns the upper take-up arm 79 is driven in time with the needle. From the upper take-up arm 79 the twine passes downward through an opening 79$^a$ (see Fig. 13) in a part of the framing and through the eye of the lower take-up arm 86 and also through the eye of a fair-leader 87, secured rigidly to the framing and hanging down therefrom, as best shown in Figs. 2 and 3.

The lower take-up arm 86 is pivoted in the frame at the point 88 (see Figs. 2, 3, and 4) and has an antifriction-roller 89, mounted loosely on a pin carried fast by the arm. (See Fig. 13.) This roller is engaged by a cam 90, fast to the shaft 53, so that as the shaft 53 revolves the cam presses the roller to throw the take-up arm 86 rearwardly away from the needle. The lower take-up arm 86 is pressed forwardly by an expansive spring 91, bearing between the arm and the frame. The twine passes from the fair-leader 87 through the eye of the needle to the knotter mechanism, which will be hereinafter described.

After a bundle has been tied and ejected from the machine the needle and the presser-foot assume the position shown in Fig. 3, so that the grain pushed forwardly by the packer-arms is banked forwardly toward the needle and presser-foot. Now for the purpose of releasing the dog 21$^c$ of the clutch 21 and causing the gear 20 to turn with the shaft 14 I provide means actuated by the pressure of the gavel at this stage of the operation, which means consists in a lever 92, fulcrumed on the rear side of the rod 67 and having connection with a link 93, running rearwardly to and pivoted on a crank-arm 94, fast to a shaft 95, which extends transversely across the rear of the machine to the left-hand extremity thereof, (see Fig. 2,) at which point it is provided with a fast crank-arm 96, the end of which is pivoted to a downwardly-running link 97, guided at its lower end by a strut 98, projecting downward from the frame. The lower portion of the link 97 carries a pin 99, which is adapted when the link moves upward to bear against a plate 100, formed integral with an arm rigidly fastened to the arm 31 and projecting downward therefrom. (See Fig. 19.) The arm 31 engages the clutch 21 to hold the same out of gear, and when the grain bears forwardly against the lever 92 it trips said lever, rocks the shaft 95, and raises the link 97, which, through the medium of the pin 99 and plate 100, throws upward the arm 31 independently of the arm 29, thereby throwing the clutch into gear and causing the gear 20 and its attached parts to turn with the shaft 14. It is by this action that the knotting and binding devices are thrown into movement. The grain as it is pushed forward is forced beneath a shoe 101, carried rigidly by the frame and running longitudinally of the machine, such shoe having an opening through which pass the needle, the presser-foot rod, and the lever-bar 92.

The shuttle is mounted to oscillate on a shaft 102. (See full lines in Fig. 20 and dotted lines in Figs. 2, 3, and 4.) The shaft 102 is mounted loosely in the center of the circular shuttle-box 103, and the shuttle comprises the shuttle-holder 104, fast to the shaft 102, the shuttle proper, 105, rested loosely in the holder, and the arm 106, carried by the holder 104 and spring-pressed against the shuttle proper to hold it in place. The outer edge of the shuttle is arc-shaped, so as turn true within the box 103. The shuttle-thread is wound on a bobbin, and the bobbin is placed within the shuttle proper, 105, all in the usual manner, the thread passing out from the inner side of the shuttle. (See Fig. 20.) The shaft 102 has a bevel-pinion 107, (see full lines in Fig. 20 and dotted lines in Figs. 2, 3, and 4,) which meshes with a toothed sector 108, fulcrumed on a short shaft 109, mounted in the lower portion of the frame. The right-hand end of this shaft 109 carries a rigid crank-arm 110, whereto is pivoted the arm 111 of the strap 112, which strap encircles a cam 114, fast on the knotter-shaft 24, before mentioned. Therefore as the shaft 24 turns by the action of the gears 20 and 25 the sector 108 is rocked, and the shaft 102 is given a like movement, causing the shuttle to oscillate within the box 103, the movement of the shuttle being past each side of the vertical line in which the needle is disposed.

The thread from the shuttle (see Figs. 5, 6, and 20) passes up out of the box 103 to the shuttle-thread-disposing claw 115, which is mounted loosely on the upper end of a shaft 116 and which has a spring-wire inside of its fingers or projections, such wire forming a yielding thread-engaging surface. Fast to the shaft 116 is a short crank-arm 117, which carries a pin 118. This pin plays loosely in an arc-shaped slot 119, formed in the claw 115. The lower end of the shaft 116 carries a bevel-gear 120, meshing with a similar gear 121, fast to the shaft 102. Therefore the shaft 116 rocks with the shaft 102, and the pin 118 of the crank-arm 117 plays through the slot 119 of the claw 115, so that the claw 115 is thrown from side to side, although the slot 119 in the claw provides for a certain lost movement in the claw 115, which is necessary to the accurate timing of the several parts. Held rigidly by the frame and disposed between the crank-arm 117 and the claw 115 is a guide-plate 122, formed with a large orifice therein, as shown best in Figs. 7 and 20, which permits the passage of the needle and thread. The front end of the plate 122 is attached to the upper periphery of the shuttle-box 103. (See Figs. 4 and 20.)

The table 18 is provided at its front edge and directly over the shuttle-box 103 with devices for holding and cutting the threads, which devices comprise a rock-shaft 123, mounted in the table and having fast thereto a knife 124 and a clamp 125. (See Figs. 9, 20, and 21.) The knife 124 and clamp 125 are located at the rear extremity of the table 18. The rear end of the shaft 123 has a crank-arm 126 fast thereto, to which arm is pivoted a transversely-running link 127. This link extends to the left-hand side of the machine and is pivoted at its lower end to an arm 128, in turn pivoted to the frame at the upper end of the arm. The arm 128 carries an anti-friction-roller 129, which plays in the groove of a cam 130, fast to the short shaft 27, before mentioned. The cam 130 is therefore driven in unison with the gear 26, and this cam drives the arm 128 and link 127, which in turn rocks the shaft 123, and therefore drives the knife 124 and clamp 125. The knife 124 acts against a ledger-blade 131, and the clamp acts against binding-surface 132. Fitted in one of the timbers forming part of the table 18 is a notched bushing 133. (Shown *per se* in Figs. 5 and 6 and shown in position in Fig. 9.) Through this bushing the shuttle-thread passes upwardly, and the bushing also has the point of the needle reciprocated therein, as shown *per se* in Figs. 5 and 6. For the purpose of raising the twine above the bushing 133 and holding the twine in position to be properly knotted I provide a bar 134, that extends transversely between and is fastened to the plates 135, which are pivoted to the said timber of the table 18 on horizontal pivots and which have curved lower edges engaged by cams 136, fastened to the leaf 43 of the table, so that as the leaf is raised the plates 135 and bar 134 are also raised to hold the twine up in the position shown in Fig. 4. Then when the leaf is lowered the bar 134, with the plates 135, drops (see Figs. 9 and 20) to permit the twine to come into engagement with the clamp and knife. The table drops when the knot is finished and the bundle is to be expelled, and consequently at this time it is necessary to sever the twine forming the band of the bundle from the standing parts of the twine and also to clamp the ends of said standing parts, which operations take place when the bar 134 drops to the position shown in Fig. 9. A slotted shield-plate 137 is mounted on the table 18 over the top of the parts 124, 125, and 133 and other elements, to be hereinafter described, for the purpose of preventing the grain from falling thereon.

For the purpose of pushing the thread forwardly toward the knife and clamp and also for tightening the several hitches forming the knots tied I provide an arm 138. This arm 138 has an upwardly, forwardly, and laterally extended finger 139, (best shown in Figs. 8 and 15,) which extends above the plates 135 and under the plate 137, and which serves to engage the twine and push the hitches forming the knots forward of the knife and clamp. The arm 138 is mounted to slide in a rocking holder 140, mounted on the frame. The right-hand end of the arm has a strap 141 fast thereto, which engages a cam 142, fast on a short shaft 143, mounted in the frame. (See Fig. 15.) This shaft carries at its upper end a miter-gear 144, (see Fig. 7,) in mesh with a similar gear 145, fast on a shaft 146, revolubly mounted in the frame and extended to the left-hand side of the machine, where it is provided with a fast pinion 147, meshing with the spur-gear 26. (See Fig. 2.) Therefore as this gear 26 turns the shaft 146 is revolved and the arm 138, by the action of the eccentric 142, is given a combined sliding and swinging movement, causing the arm to move forward to push the hitch toward the rear side of the machine beyond the bar 134, (see Figs. 6, 23, 26, and 27,) and thence sidewise and rearwardly, (see Figs. 8 and 15,) in readiness to push the thread forward a second time.

The coacting movement of the several parts may be traced as follows: When the grain is banked against the lever-bar 92, it being assumed that the clutch is out of gear, the grain trips the lever and throws the clutch into gear, so as to start the pinion 20 and the connected parts. The divider now moves up to form the gavel and pushes the same forwardly upon the table. The ends of the shuttle and needle threads will previously have been engaged with the clamp 125 to hold them. Now it is necessary first to tie these ends together, so that a band may be formed to pass around the gavel for binding the same. Consequently upon the first movement of the gear 20 the parts driving the needle and shuttle are set to action and the first knot is tied in the ends of the two threads for the purpose mentioned above. This knot and the action of the parts to tie the same are illustrated in Figs. 5, 6, 20, 21, 22, and 23. The knot is formed by two hitches jammed together. The needle passes the needle-twine down through the bushing 133 into proximity with the shuttle and forms in the needle-twine the loop $a$. (Shown in Fig. 5.) The claw 115 will simultaneously engage the shuttle-thread and draw the shuttle-thread rearward of the needle and to one side thereof. (See Fig. 5.) The movement of the shaft 102 throws the shuttle through the loop $a$, formed in the needle-thread, (see Fig. 5,) the shuttle moving past the front side of the needle, thus carrying the shuttle-thread through the loop and forming the first hitch of the knot. (See Fig. 6.) It will be observed that the shuttle in effecting this operation passes through the loop and the holder 104 passes outside thereof. (See Fig. 20.) The needle acting with the lower and upper take-ups will now be raised, drawing on the needle-thread to tighten the hitch. (See Fig. 6.) When these movements are being effected, the arm 138 acts (see Fig. 6) to engage the threads at the hitch therein, so that the hitch is tightened and pushed forward beyond the bar 134 of the plates 135. The needle having been raised is again lowered and presents a second loop to the shuttle, (see Fig. 21,) whereupon the shuttle moving oppositely to the first movement again carries the shuttle-thread through the loop of the needle, (see Fig. 20,) and the second hitch is thus formed. (See Fig. 22.) Simultaneously with the movement of the shuttle the claw 115 moves reversedly and draws the shuttle-thread to the opposite side of the needle. (See Fig. 21.) The needle is then again raised and the arm 138 again acts to tighten the hitch and push it forwardly to produce a complete knot. (See Fig. 23.) By this time the gavel will have been moved by the arms 56 and 57 forward beneath the needle and upon the leaf 43 of the table, so that a part of the needle-thread is passed around the gavel to form the band, it being understood that the action of the arms 56 and 57 is so timed that the instant the needle rises for a second time (which is upon the completion of the first knot just described) the arms 56 and 57 will push the gavel forward before the needle has time to descend again. The instant that the gavel is pushed beneath the needle the needle again descends to perform the first movement in tying the second knot, which knot completes the binding of the gavel. To produce the second knot, the above-described movements of the needle and shuttle and the parts 138 and 115 are repeated (see Figs. 24, 25, 26, and 27)—that is to say, the needle descends (see Fig. 24) and the shuttle is thrown through the loop formed thereby, forming the first hitch. (See Fig. 25.) The arm 28 acts to jam such hitch, (see Fig. 26,) the needle and shuttle again act to form the second hitch, and the arm 138 jams the same. (See Fig. 27.) These operations complete the band and bind the gavel into the sheaf. It will thus be seen that each sheaf-band has two complete knots therein. The gavel being now bound into a sheaf (see Fig. 5) it remains to sever the twine forming the sheaf-band from the standing parts of the needle and shuttle-threads. This is effected by means of the knife 124, timed to so operate by the parts before described. The action of the knife is attended by a simultaneous movement of the clamp 125, which binds the ends of the needle and shuttle threads, holding the same in readiness for the subsequent operations. (See Figs. 20 and 21.) Just before the knife and clamp operate, the parts controlling the table-leaf 43 will cause the leaf to drop, thus permitting the bar 134 to descend and throwing the twine down into engagement with the knife and clamp. It has been previously explained that this bar 134, being held raised by the cams 136 during the tying of the knots, serves to hold the part of the twine which is being knotted raised level with the bushing 133, thus enabling the hitches to be bound together into the effective knot.

The leaf 43 is provided with a cleat 160, with which the ends of the needle and shuttle threads are to be engaged and by which they are held before the machine is first started and before the first knot is tied between the two threads. When the machine has once started, the clamp 125 serves the purpose of the cleat, as will be understood. The leaf 43 is also provided with two upwardly-extending lips 161, which serve as guides between which the twine may pass when it is to be engaged with the cleat 160. The purpose of the presser-foot is to bear down on the grain and hold it in place during the action of the needle. In performing this function the presser-foot is in lowered position at all times except just before and during the placing of a new unbound gavel upon the leaf 43, at which period the presser-foot is timed to raise with the needle and permit the passage of the gavel beneath it, the presser-foot, with the needle, descending immediately after to hold the gavel.

Fig. 10 illustrates a modified structure which may be substituted for the claw 115. Instead of providing the claw and shaft 116 and the parts attached to the latter I may provide a bar 148, having a strap 149, from the front of which projects a finger 150. The rear portion 148$^a$ of the bar 148 is mounted to slide in a rocking holder 151, mounted on a rigid arm 152, outrunning from the frame. Working in the strap 149 is a cam 153, fast to a shaft 154, mounted loosely in the frame (see Fig. 16) and carrying a gear 155, meshing with a rack 156, which rack reciprocates to impart an oscillating movement to the shaft 154. The rack 156 is driven by a link 157, pivoted to the rack and also to a crank-arm 158, fast to the axis of an internal spur-gear 159, which is mounted directly beneath the shaft 143 aforesaid and driven by a pinion 160$^a$, fast to said shaft. This gearing causes the finger 150 to move back and forth over the bushing 133, the return being made by a rearward movement to avoid the needle when the needle is moved down. The position of the needle 59 is indicated in Fig. 10, and when the needle is raised the finger 150 moves across the position of the needle. Then as the needle is again raised the finger moves across the needle in the direction opposite to that first taken. This has upon the shuttle-thread the same action as the claw 115.

In the form of my invention shown in Figs. 1 to 10, inclusive, the parts are so arranged that the knot-tightening arm 138 engages each hitch in the two knots tied, the arm pushing each hitch to jam the same. However, under some conditions it may be preferable to arrange this arm so that it will operate only once for each gavel bound, and this operation to take place when the two knots are tied in the threads just before the threads are to be cut to permit the discharge of the sheaf. The arm then serves to tighten the knot and to push the knot and sheaf out in front of the knife, so that the knife, which is timed to operate immediately after, may sever the twine and the clamp may engage and hold the ends of the standing parts. To effect this, the shaft 146 (see Figs. 1 to 10) must be driven with the same number of turns as the shaft 27 and not with the same number of turns as the shaft 14. To so drive shaft 146, I provide (see Figs. 11 and 12) an additional line of teeth 51$^a$, carried on the rib 51 of the gear 26 and forming, like the teeth 51, a mutilated spur, the teeth 51$^a$ extending for one-fourth the circumference of the rib 51. The regular pinion 147 in Figs. 1 to 10 is replaced in Figs. 11 and 12 by a mutilated pinion 147$^a$. By this arrangement as the gear 26 makes one revolution the shaft 146 and gear 147$^a$ are also turned once and the shaft 146 by the devices hereinbefore described serves to drive the arm 138 once for each tying operation.

Having thus described my invention, I claim as new and desire to secure by Letters Patent—

1. In a grain-binder, the combination of packer-arms for advancing the grain, a divider or gavel-former, a needle, a shuttle working with the needle, a gavel-advancing arm serving to take the gavel from the divider or gavel-former and move the same forwardly to the tying position, and gearing for operatively driving the several parts.

2. In a grain-binder, the combination with means for forming the gavel, of a needle, a shuttle, means oscillating past each side of the needle to dispose the shuttle-threads, and gearing for operatively driving the several parts.

3. The combination, of a needle, a shuttle acting with the needle to tie the knot, a shuttle-thread-disposing device oscillating past each side of the needle, a swinging finger adapted to move the thread to tighten the knot, and gearing for operatively driving the several parts.

4. The combination, of a needle, a shuttle acting therewith to tie the knot, a shuttle-thread-disposing device mounted to oscillate from one side of the needle to the other, and gearing for operatively driving the several parts.

5. In a grain-binder, the combination, of a needle, a shuttle acting with the needle to tie the knot, a clamp adapted to hold the ends of the shuttle and needle threads, and gearing for operatively driving the several parts.

6. The combination, of a needle, a shuttle mounted to oscillate past each side of the needle and forming a double-hitch knot by two oscillations of the shuttle, a clamp serving to hold the ends of the shuttle and needle threads, and gearing for operatively driving the several parts.

7. In a grain-binding apparatus, the combination of means for forming the gavel, an advancing arm serving to move the gavel forwardly from said means, a needle, a shuttle acting with the needle to tie the knot, the shuttle and needle operating first to tie together the ends of the shuttle and needle threads, after which the gavel-advancing arm pushes the gavel forwardly of the needle and the needle and shuttle subsequently serving to again tie the threads to form the sheaf-band, and gearing for operatively driving the several parts.

8. The combination of means for forming the gavel, a needle, a shuttle acting with the needle to tie together the ends of the needle and shuttle threads, a gavel-advancing arm serving to move the gavel to the front of the needle after the ends of the threads have been tied, the needle and shuttle then serving to again knot the threads, and gearing for operatively driving the several parts.

9. In a grain-binding apparatus, the combination of a needle, a shuttle acting with the needle, a clamp serving to hold the ends of the shuttle and needle threads, a knife acting in unison with the clamp to sever the threads, a bar mounted adjacent to the clamp and movable to raise the threads from the clamp and knife, and gearing for operatively driving the several parts.

10. In a grain-binding apparatus, the combination of a needle, a shuttle acting with the needle to tie the knot, shuttle-thread-disposing devices, a clamp for holding the ends of the threads, a knife acting in unison with the clamp to sever the threads, a movable bar adjacent to the clamp and knife, to periodically raise the threads above the same, and gearing for operatively driving the several parts.

11. In a grain-binding apparatus, the combination with knotting devices, of a clamp, a knife, a movable bar serving periodically to raise the threads from the clamp and knife, and gearing for operatively driving the several parts.

12. In a grain-binding apparatus, the combination with a table, of a swinging leaf mounted at the rear thereof, a cam carried on said leaf, knotting devices comprising a clamp and knife, a swinging plate mounted on the table and engaged by the cam on said leaf, and a bar carried by the plate and serving periodically to raise the threads out of engagement with the clamp and knife.

13. In a knotter, the combination of a needle, a shuttle acting therewith, a shuttle-thread-disposing claw mounted to oscillate past each side of the needle and having a slot therein, a driving member for the claw, such member having a portion playing loosely in the slot, and gearing for operatively driving the several parts.

14. In a grain-binder, the combination with the primary or drive shaft, of a clutch, a shuttle, a needle, gavel forming and advancing devices, a presser-foot acting in time with the needle, gearing for driving the shuttle, the needle, the presser-foot and the gavel forming and advancing devices from the said clutch, and means comprising a trip-lever mounted on the presser-foot for throwing the clutch into gear, the trip-lever being moved with the presser-foot into the path of the gavel, to be tripped by the same.

15. In a grain-binder, the combination with a prime-mover shaft, of a clutch acting therewith, a needle, a shuttle, a presser-foot acting in time with the needle, gavel forming and advancing devices, the needle, the shuttle, the presser-foot, and the gavel forming and advancing devices being driven by gearing from the clutch, and means for throwing the clutch into gear, such means comprising a member carried on the presser-foot and actuated by the pressure of the gavel against the same.

16. In a grain-binding apparatus, the combination of a prime-mover shaft, a clutch acting with the same, a shuttle, a reciprocating needle, gavel forming and advancing devices, a vertically-reciprocating rod arranged parallel and acting in time with the needle, gearing driven from the clutch and serving to drive the needle, the shuttle, the gavel forming and advancing devices, and the said rod, a lever fulcrumed on and moving with the vertical rod and actuated by the pressure of the gavel against it, a link actuated by the lever, and a rocking crank-shaft with its crank attached to the link, the crank-shaft having connection with the clutch.

17. In a grain-binder, the combination with the knotter, of a prime-mover shaft, a clutch on the shaft, gearing for operating the knotter from the clutch, a swinging arm, a link connecting the arm with a member of said gearing for operating the knotter, a clutch-tripping arm mounted yieldingly on the said swinging arm, and means for periodically raising the tripping-arm independently of the said swinging arm.

18. In a grain-binding apparatus, the combination of a driven gear having a cam-slot therein, a rocking spider acting with the cam-slot and rocked thereby, a presser-foot shaft having linked connection with the spider and driven thereby, a divider-shaft, and a connection between the divider-shaft and the spider, to drive the divider-shaft.

19. In a grain-binding apparatus, the combination of a prime-mover shaft, a clutch thereon, a gear driven from the clutch and having a cam-slot therein, a swinging arm, a link connecting the arm with said gear, a clutch-tripping arm yieldingly mounted on the swinging arm, means for actuating the clutch-tripping arm, from the pressure of the gavel, a pivoted spider having a part playing in the slot of the gear to drive the spider, a presser-foot shaft in connection with the spider and driven thereby, and a divider-shaft also in connection with the spider and driven thereby.

20. In a grain-binding apparatus, the combination with knotting devices, comprising a shuttle and a shuttle-thread-disposing claw, of a knotter-shaft, a cam on the knotter-shaft, a strap driven by said cam, a toothed sector in connection with the strap, a shuttle-shaft geared with the sector, and a claw-operating shaft geared with the shuttle-shaft.

21. In a grain-binding apparatus, the combination of a prime-mover shaft, a clutch mounted thereon, means for controlling the clutch from the pressure of the gavel, a needle-shaft, a needle driven therefrom, a presser-foot shaft, a presser-foot driven therefrom, links in connection with the presser-foot and needle-shafts, a sleeve mounted loose on the prime-mover shaft, means carried on the sleeve for driving the two links, and a connection between the clutch and sleeve to turn the sleeve with the prime-mover shaft when the clutch is in gear.

22. In a grain-binding apparatus, the combination with means for forming the gavel, of knotting mechanism comprising a shuttle and a needle serving to bind the gavel, the needle being movable to permit the passage of the gavel beyond the knotting mechanism, a gavel-advancing arm serving first to move the gavel from the means for forming the same to the knotting mechanism, and subsequently to move the gavel past the knotting mechanism, and means for driving the operative parts.

ALEXANDER G. McINTOSH.

Witnesses:
E. C. NICHOLS,
J. E. McINTOSH.